(12) United States Patent
Hopkins

(10) Patent No.: US 11,023,980 B1
(45) Date of Patent: Jun. 1, 2021

(54) COVERAGE AT A GLANCE

(71) Applicant: UNITED SERVICES AUTOMOBILE ASSOCIATION (USAA), San Antonio, TX (US)

(72) Inventor: John Chandler Hopkins, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 259 days.

(21) Appl. No.: 16/211,814

(22) Filed: Dec. 6, 2018

Related U.S. Application Data

(63) Continuation of application No. 14/136,441, filed on Dec. 20, 2013, now Pat. No. 10,163,161, which is a continuation of application No. 12/103,515, filed on Apr. 15, 2008, now Pat. No. 8,645,169.

(51) Int. Cl.
*G06Q 40/08* (2012.01)
(52) U.S. Cl.
CPC ................... *G06Q 40/08* (2013.01)
(58) Field of Classification Search
USPC ........................................................ 705/1, 4
See application file for complete search history.

(56) References Cited

U.S. PATENT DOCUMENTS

| | | | | |
|---|---|---|---|---|
| 5,956,691 A * | 9/1999 | Powers | ................. | G06Q 40/08 705/4 |
| 7,761,313 B1 * | 7/2010 | Brown | ................... | G06Q 40/00 705/4 |
| 8,090,597 B1 * | 1/2012 | Pienkos | ................. | G06Q 40/08 705/4 |
| 8,825,505 B1 * | 9/2014 | Alava | ................... | G06Q 40/08 705/4 |
| 2002/0116228 A1 * | 8/2002 | Bauer | .................... | G06Q 40/08 705/4 |
| 2002/0138386 A1 * | 9/2002 | Maggioncalda | ....... | G06Q 40/02 705/36 R |
| 2002/0188484 A1 | 12/2002 | Grover et al. | | |
| 2003/0169295 A1 * | 9/2003 | Becerra, Jr. | ............. | G06F 40/18 715/765 |
| 2004/0024619 A1 | 2/2004 | DiBella | | |

(Continued)

OTHER PUBLICATIONS

New Web sites offer rating tool, instant quotes Pasher, Victoria Sonshine. National Underwriter Property & Casualty-Risk & Benefits Management n26: p. 6(1). Summit Business Media. (Jun. 24, 1996) (Year: 1996).*

(Continued)

*Primary Examiner* — William E Rankins
(74) *Attorney, Agent, or Firm* — Baker & Hostetler, LLP

(57) ABSTRACT

A graphical representation is provided that displays a user's insurance coverage via the graphical representation, the user may request information about various aspects of the coverage and/or may request to chat or speak with a representative that specializes in a particular coverage area. The graphical representation may show how the user's insurance coverage compares to population groups and medians. A user may adjust the coverage on the graphical representation and be provided with a revised premium amount. The user may select this coverage to be implemented and the user's policy may be appropriately revised.

20 Claims, 6 Drawing Sheets

(56) References Cited

U.S. PATENT DOCUMENTS

| | | | |
|---|---|---|---|
| 2004/0039610 A1* | 2/2004 | Weitermann | G06Q 40/08 705/4 |
| 2005/0049986 A1* | 3/2005 | Bollacker | G06Q 10/04 706/46 |
| 2005/0108028 A1 | 5/2005 | Arehart | |
| 2005/0187851 A1* | 8/2005 | Sant | G06Q 40/06 705/36 R |
| 2005/0228701 A1 | 10/2005 | Martin | |
| 2007/0019794 A1 | 1/2007 | Cohen et al. | |
| 2007/0038488 A1 | 2/2007 | Bauer et al. | |
| 2007/0060227 A1* | 3/2007 | Pankey | G09B 19/18 463/1 |
| 2007/0143239 A1* | 6/2007 | Boyle | G06N 5/04 706/45 |
| 2008/0154651 A1 | 6/2008 | Kenefick et al. | |
| 2010/0061528 A1* | 3/2010 | Cohen | H04M 3/493 379/88.04 |
| 2010/0070311 A1* | 3/2010 | Heydon | G06Q 40/08 705/4 |

OTHER PUBLICATIONS

"Get Insurance" Retrieved from the internet <URL: http://agnewsarchive.tamu.edu/droughUdrghtpak98/drght77.html/>.

"Online Automobile Insurance Rates: Ccs Car Insurance's overall briefing" Retrieved from the internet <URL: http://www.nolabelsfit.com/infodiscount-ccs-car-insurance.html>.

Articlesbase—"Choosing the Right Auto Insurance for You—How to Compare Auto Insurance Quotes?" Retrieved from the internet <URL: http://www.articlesbase.com/non-fiction-articl es/choosing-the-right-auto-insurance-for-you-how-to-compare-auto-insurance-quotes-25356.html>.

INSUR comparison-rate. CAR—"Auto html>Ins . Rate Quotes" Retreived from the internet <URL: http://www.cgnonline.com/insurance-car-comparison-rate.html>.

OECD—Organisation for Economic Co-Operation and Development— "Awareness and Education on Risk and Insurance Revised Analytical and Comparative Report" Retrieved from the internet <URL: http://www.oecd.org/dataoecd/43/14/38962007 .pdf>.

Seniorjournal.com—"Many Senior Citizens May Not Know What Is Not Covered by Homeowners Insurance" Retrieved from the internet <URL: http://seniorjournal.com/NEWS/Alerts/2007/7-06-13-ManySenior.htm>.

"Get Health Insurance Quotes, Compare Plans and Apply Online!" Retrieved from the internet <URL: http://www.healthcoveragequotes.com/>.

"3 Easy Steps to Health Insurance 1-Get Quotes 2-Compare Plans 3-Apply Online" Retrieved from the internet <URL:http://www.ehealthinsurance.com/>.

* cited by examiner

400

COVERAGE AT A GLANCE

CROSS REFERENCE TO RELATED APPLICATIONS

This application is a continuation of U.S. application Ser. No. 14/136,441, filed on Dec. 20, 2013, which claims priority to, U.S. patent application Ser. No. 12/103,515, filed on Apr. 15, 2008 now U.S. Pat. No. 8,645,169, issued on Feb. 4, 2014, entitled "Coverage At A Glance," which is incorporated herein by reference in its entirety.

BACKGROUND

Much of the language and terminology common to insurance policy documentation is necessary for legal purposes but is difficult for many people to understand. Many people believe an insurance policy they had purchased has adequate coverage or own a policy that once provided adequate coverage only to find out in time of peril that the policy's coverage is, in fact, not adequate. This is due in part to the ambiguous nature of insurance policy coverage documentation which leaves people unaware of their risk potential, and unsure about the boundaries of their insurance policies.

SUMMARY

A graphical representation is provided that displays a user's insurance coverage. Via the graphical representation, the user may request information about various aspects of the coverage and/or may request to chat or speak with a representative that specializes in a particular coverage area.

In an implementation, the graphical representation may show how the user's insurance coverage compares to population groups and medians. The user or an institution system may select the groups and/or medians that the user's insurance coverage is to be compared against.

In an implementation, a user may adjust the coverage on the graphical representation and be provided with a revised premium amount. The user may select this coverage to be implemented and the user's policy may be appropriately revised.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
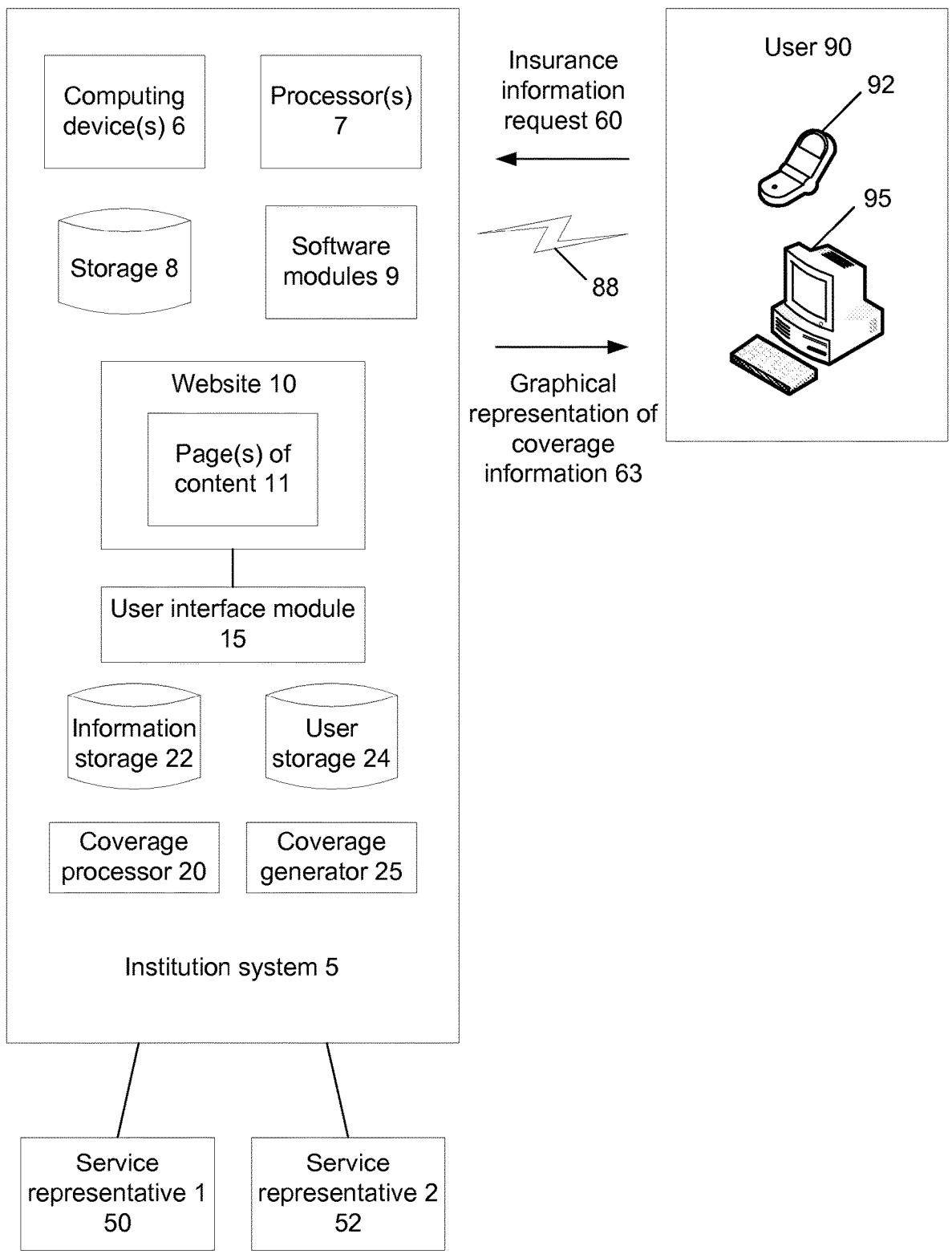
FIG. 1 is a block diagram of an implementation of a system that may be used to provide insurance policy coverage information.

FIG. 1 is a block diagram of an implementation of a system that may be used to provide insurance policy coverage information. An institution system 5, associated with or otherwise maintained by an institution such as an insurance company or financial services institution, may include a coverage processor 20 that may process an insurance information request 60 from a user computing device 92, 95 associated with a user 90. The coverage processor 20 may retrieve information from storage, such as information storage 22 and user storage 24, and use the information in processing the insurance information request 60.

A coverage generator 25 may generate coverage information pertaining to the user and population groups and/or medians, described further herein. The coverage generator 25 may receive information from the coverage processor 20 as well as from information storage 22 and user storage 24, for example. The coverage generator 25 may generate a graphical representation, or information for the graphical representation, of coverage information 63 that is provided to a user computing device 92, 95. As described further herein, a graphical representation of a user's insurance policy coverage may be provided to a user. In an implementation, the provided graphical representation may illustrate the upper and lower coverage boundary's limits, the per-user limit (if applicable), the per-accident coverage limit (if applicable), the recommended coverage level for the user based on relevant user information, and the user's current coverage limit, for example.

Information storage 22 may contain information pertaining to users who have insurance policies or other types of products or accounts hosted by the institution system, data related to the policies, products and accounts, and population and demographic data pertaining to the users, for example. Information storage 22 may include data that may be used in the generation of the graphical representation of coverage information 63. User storage 24 may contain information directed to users, such as name, address, marital status, account information, etc., for example.

The graphical representation of coverage information may be provided via a website 10 to a user computing device 92, 95 associated with a user 90. For purposes of clarity and simplicity, an applicant for an insurance policy or a current holder of an insurance policy may be referred to herein as a "user." Thus, any reference to a user herein also includes any type of applicant, institution member or prospective member, or the like.

In an implementation, instead of hosting the website 10, the institution system 5 may comprise a conventional application server hosting a proprietary online service accessible only by a private network. In any event, the institution system 5 may have appropriate security mechanisms in place to prevent unauthorized third parties from intercepting the user's information.

The user 90 may provide data to the institution system 5 via a user computing device 92, 95. The user computing device may be a handheld computing device such as a personal digital assistant (PDA) or a mobile phone, for example, or any type of personal computer (PC). The user computing device and the institution system 5 may be connected over a network 88. It is contemplated that the network 88 may be any type of private or public communication network such as, for example, an intranet, Internet, local area network (LAN), wide area network (WAN), wireless fidelity (WiFi) network, cellular connection, plain old telephone service (POTS), and the like. An example user computing device is described with respect to FIG. 6.

As described further herein, one of the service representatives 50, 52 associated with the institution system 5 may confer with a user 90 about coverage information. Such a conference may be via a chat session or a telephone, for example. Each service representative may be specialized to a particular coverage area so the user may speak with a specialist regarding any questions the user has regarding coverage information. Although only two service representatives 50, 52 are shown in FIG. 1, it is contemplated that any number of service representatives may be associated with the institution system 5.

In an implementation, a user interface module 15 may receive content from the coverage generator 25 and format one or more pages of content 11 as a unified graphical presentation that may be provided to a user computing device 92, 95. The page(s) of content 11 may be directed to a graphical representation of coverage information and may be provided to a user computing device 92, 95 via the website 10 associated with the institution system 5. It will be appreciated that, in an embodiment, a service representative 50, 52 of the institution may access the user interface module 15, or the underlying graphical representation of coverage information, to assist the user 90 with any questions the user may have.

When the user 90 accesses the website 10, using a web browser on a user computing device 92, 95, they may be presented with information pertaining to an insurance policy that they are considering purchasing or an insurance policy that they already have purchased, via the page(s) of content 11. The information may be in a graphical representation form, further described with respect to FIG. 3, for example. The user 90 may enter information into the graphical representation via a web browser on a user computing device 92, 95.

The content may be personalized to the user 90, using information retrieved from the user storage 24, for example. Personalization may include presentation of the page(s) of content 11 and/or functionality of the page(s) of content 11. For example, a graphical representation displayed on the page(s) of content 11 may be pre-filled with some information pertaining to the user, such as name, address, policy number, etc. In an implementation, personalization may be directed to an automobile insurance policy, and may provide specific information on the user's automobiles or aspects of the user's coverage. Personalization is not limited to automobile insurance policies and may be directed to any type of data, information, product, service, advertisement, etc.

As described further herein, in an implementation, the user 90 may modify their insurance policy online via the graphical representation. The user may be provided with one or more documents online, via the website 10 or via email for example, that they can electronically sign. Any known electronic signature technique may be may used. The user 90 may electronically sign the one or more documents and provide them electronically to the institution system 5, via email or the website 10 for example.

The institution system 5 may comprise one or more computing devices 6. A user computing device 92, 95 may allow the user 90 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user, groups of users, and/or insurance policies, may be stored in storage 8 or other storage, for example.

Example software modules may include modules for sending and receiving information between the institution system 5 and the user 90, requesting and retrieving information from storage 8, information storage 22, and user storage 24, processing insurance information requests, and generating graphical representations of coverage information, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 2:
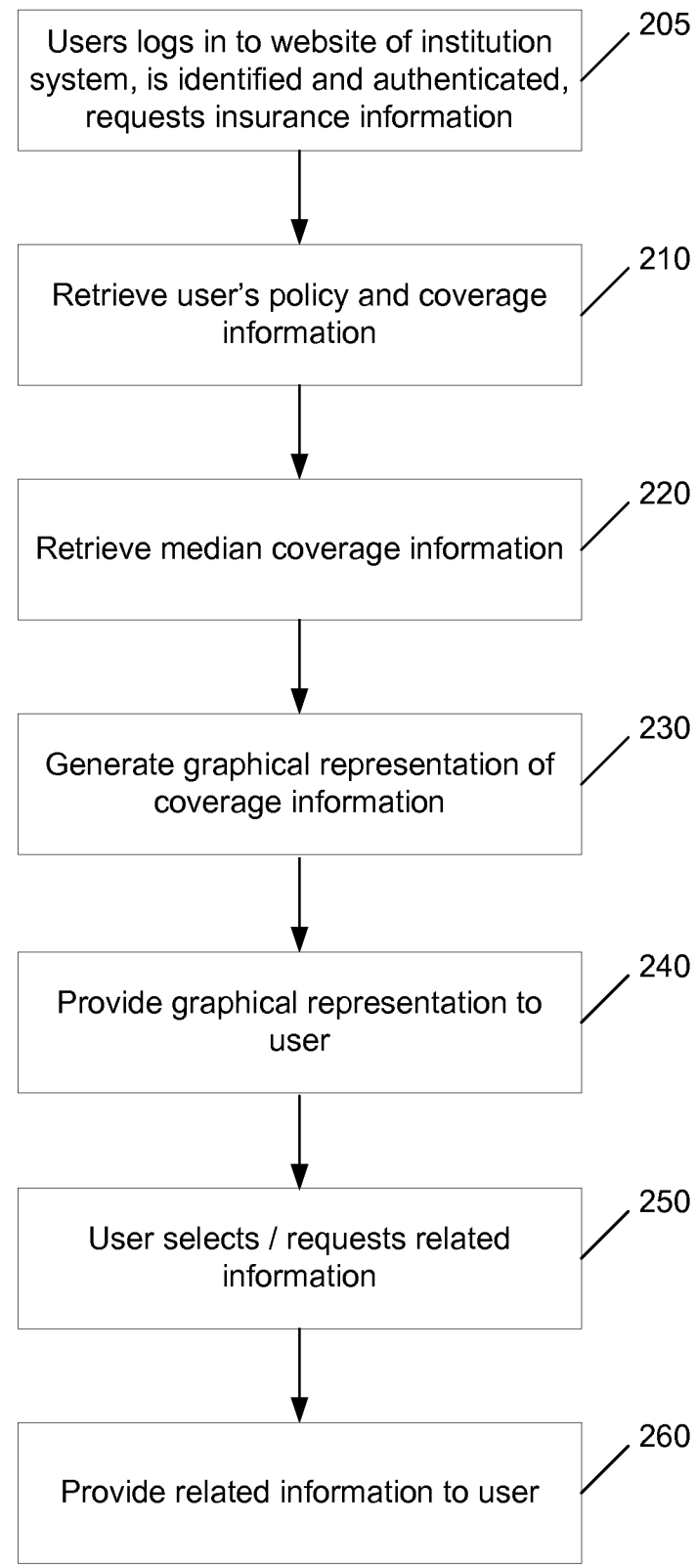
FIG. 2 is an operational flow of an implementation of a method that may be used to provide insurance policy coverage information.

FIG. 2 is an operational flow of an implementation of a method 200 that may be used to provide insurance policy coverage information. A user may be provided with a graphical representation of their insurance coverage along with how it compares to median coverage variables.

At operation 205, a user may log into a website associated with the institution system, may be identified and authenticated using any known techniques, and may request insurance information. At operation 210, information pertaining to the user and the user's policy and coverage information may be retrieved from storage. At operation 220, median coverage information pertaining to the type of policy that the user has may be retrieved and/or generated based on information that may be retrieved from storage. The median coverage information comprises information that is directed to the median coverage that policy holders of the institution have. This information may be previously determined and stored in storage or may be computed or otherwise generated on the fly, in real-time, when requested. In an implementation, the user may not currently have a policy and as such, user's policy and coverage information may not be retrieved, but median coverage may still be retrieved and/or generated for display on the graphical representation.

At operation 230, a graphical representation of coverage information may be generated based on the retrieved information. The graphical representation is provided to the user via a computing device. An example graphical representation is described with respect to FIG. 3.

At operation 240, the graphical representation may be provided to the user. The user may view the graphical representation. The user may request or select information related to an aspect of the graphical representation, such as information directed to one of the coverage areas or information directed to a premium, at operation 250. The user may make a selection by selecting a link displayed on the graphical representation, highlighting an area of the graphical representation, and/or clicking on an area of the graphical representation, for example. The information that the user may select may then be provided to the user via a website, email, and/or a representative of the institution, for example, at operation 260.

Obtaining information may include retrieving linked documents, activating a 'QuickTime', Windows Media' or other video document, instancing an "instant message" or "chat" interface with a representative, or instancing a live person-to-person video teleconference, for example. Additionally, the user may access exemplary policy representations based on text descriptions of example user scenarios. The information may comprise text documents or files, video documents or files, or any other form of information presentation.

In an implementation, the user may select to communicate with a representative via a chat session using the user computing device for example, or via a telephone conference. For example, in an implementation, a user may initiate a consultation with a representative regarding a policy element by clicking on an element of the graphical representation about which information is desired. Multiple representatives may be available to communicate with the user, where each representative is a specialist in a different area of the policy. In this manner, a user may directly be put into communication with a specialist in a particular area of interest to the user.

Figure 3:
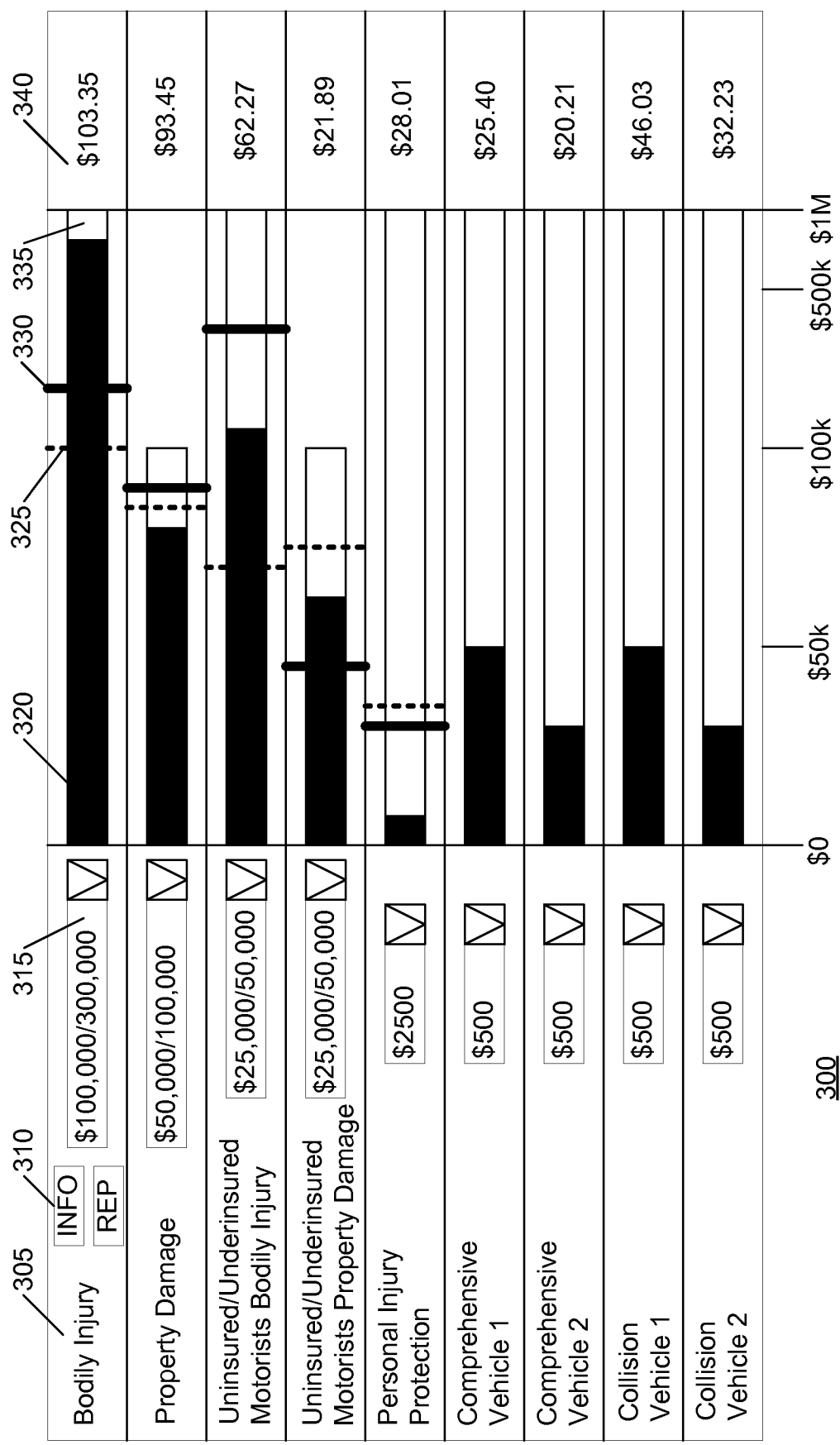
FIG. 3 is an implementation of an example screen shot of a graphical representation of insurance policy coverage information that may be provided to a user.

FIG. 3 is an implementation of an example screen shot 300 of a graphical representation of insurance policy coverage information that may be provided to a user. The example shown in FIG. 3 is based on an automobile insurance policy, but it is contemplated that any type of insurance policy may be represented in a like manner.

Each coverage element 305 of the policy (e.g., bodily injury, property damage, towing and labor, etc.) has available coverage amounts 315 in drop down menus, for example, that may be selected by a user. Other coverage elements than those shown in FIG. 3 may be provided, such as medical expenses, loss of income, essential services, medical payments, rental reimbursement, towing and labor, etc., for example.

In an implementation, the user may also enter coverage amounts directly and not rely on drop down menus. Also provided are INFO and REP selection buttons 310 that a user may select to get more information on the related coverage element or to contact a specialized representative for that coverage element area. Although only one set of INFO/REP selection buttons are shown, it is contemplated that each coverage element may have its own set of INFO/REP selection buttons that when selected provide information or contact a representative directed to that particular coverage element area. In an implementation, the graphical representation may be provided, in whole or in part, to a representative who may be assisting the user.

A dynamic bar chart is also provided in the graphical representation. The bar chart graphically provides information for each of the coverage elements. Information may include items such as coverage amount 320, median 325, recommended amount 330, and limit 335. Dollar amounts pertaining to the display, for example, may be provided along an axis of the chart, and may be displayed linearly, exponentially, or in any suitable manner.

Figure 4:
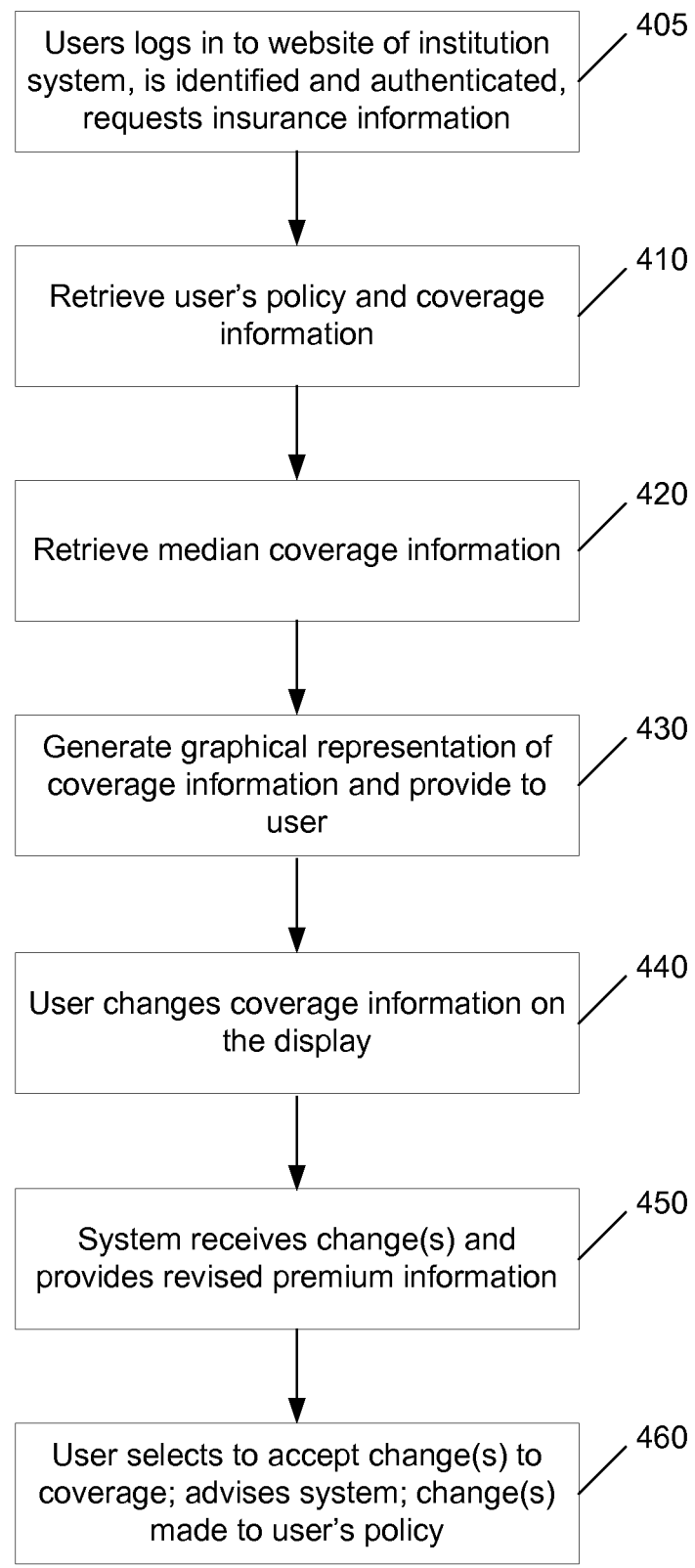
FIG. 4 is an operational flow of another implementation of a method that may be used to provide insurance policy coverage information.

Coverage amount 320 indicates the amount of coverage the user has in their current policy, or if the user has adjust the coverage amount, as described with respect to FIG. 4 for example, coverage amount 320 indicates that adjusted coverage amount. Median 325 may refer to the median amount of coverage provided to all users who have a policy with the institution system. Median 325 may also refer to the median amount of coverage that a selected population group has, as described with respect to FIG. 5, for example.

In an implementation, the institution system may determine a recommended amount of coverage 330 that a user should have in one or more coverage areas. Such recommended amounts may be indicated on the graphical representation. The institution system may use various data and calculators for example to determine recommended amounts. Recommended amounts of coverage may be based on data that the institution system has on the user and other users.

A coverage limit 335 for the coverage areas may also be displayed on the graphical representation. In this manner, the user may see where their amount of coverage stands relative to the maximum amount of coverage available.

Premium information 340 may also be provided for each of the coverage elements 305. As the user changes the coverage amount 320 for a coverage element 305 using the associated amount selector 315, the associated premium amount 340 may also change. A user may modify a coverage amount or a deductible, for example, and the premium is automatically updated by the system. In this manner, a user may see how their premium will change as they consider different coverage amounts and/or deductibles for various coverage elements. Thus, the user may see in a graphical format the ramifications of modeled insurance policy coverage changes. A total premium amount comprising the sum of the coverage elements' premiums may be provided. Alternatively, a user may tell the system how much premium they would like to pay, and the system can provide the user with recommended coverage they may get for that premium amount. In an implementation, if the user likes the policy changes, they can click a commit button or other selector and put the policy changes into effect.

Additional information may be displayed, such as coverage information, amounts, and/or ranges pertaining to one or more population groups, and ranges based on the median, such as a range of low and high amounts around the median, for example. The graphical depictions may illustrate available coverage options, the user's current policy's coverage, minimum and maximum coverage limits, and the recommended coverage limit of the associated coverage category. Some coverage categories reflect coverage information for each of the consumer's vehicles. Further implementations may include, but are not limited to, industry recommended coverage levels, state required coverage levels, and lienholder coverage requirements. Although a bar chart with particular indicators is shown, it is contemplated that any type of graphical representation and any type of indicators may be used.

In an implementation, the coverage elements 305 list each of the current policy line item coverage categories. The initial rendering of the graphical representation loads the user's current coverage designations for each line item into the drop-down list-box amount selector 315 associated with each line item category. The graphical representation allows the user to select alternative coverage options via the drop-down list-box. Option selection may initiate a recalculation of the page to demonstrate the net effect the change would have on coverage and policy premium. It should be noted that changes to the line item coverage's are static changes for illustration and decision making purposes. Changes do not update the actual policy coverage designations unless the user commits the changes via a "Keep Changes" button or an "Update My Policy" button or the like. Thus, the graphical representation allows the user to lock in changes to their policy limits. "Locking in" refers to the method by which the institution updates its formal policy documentation to reflect the changes to the policy and to ensure a legal binding contract.

FIG. 4 is an operational flow of another implementation of a method 400 that may be used to provide insurance policy coverage information. Operations 405 through 430 are similar to operations 205 through 240 described with respect to the method 200 of FIG. 2 and are briefly described here.

At operation 405, a user may log into a website associated with the institution system, may be identified and authenticated using any known techniques, and may request insurance information. At operation 410, information pertaining to the user and the user's policy and coverage information may be retrieved from storage. At operation 420, median coverage information pertaining to the type of policy that the user has may be retrieved and/or generated based on information that may be retrieved from storage. At operation 430, a graphical representation of coverage information may be generated based on the retrieved information and provided to the user.

The user may view the graphical representation, and at operation 440, may change a coverage amount or deductible for a coverage element on the graphical representation. At operation 450, the institution system may receive the change and revise the premium information for that coverage element. The revised premium information may be displayed to the user via the graphical representation. At operation 460, a user may select to accept the change to the policy, and may advise the institution system, e.g., by selecting a "Keep Changes" button or an "Update My Policy" button or the like, as described above. The change may be made to the user's policy by the institution system and the user may be provided with or otherwise apprised of the updated insurance policy.

Thus, the graphical representation that is provided to a user allows the user to adjust various coverages and amounts (e.g., bodily injury $300,000, medical expenses coverage included, etc.) of an insurance policy and then see how those adjustments will affect the premium the user has to pay. Alternatively, a user who does not have a policy in place may use the graphical representation to build their own policy by selecting and adjusting various coverages and amounts, seeing what the premiums are, and then purchasing a policy having the selected coverage and amounts.

Figure 5:
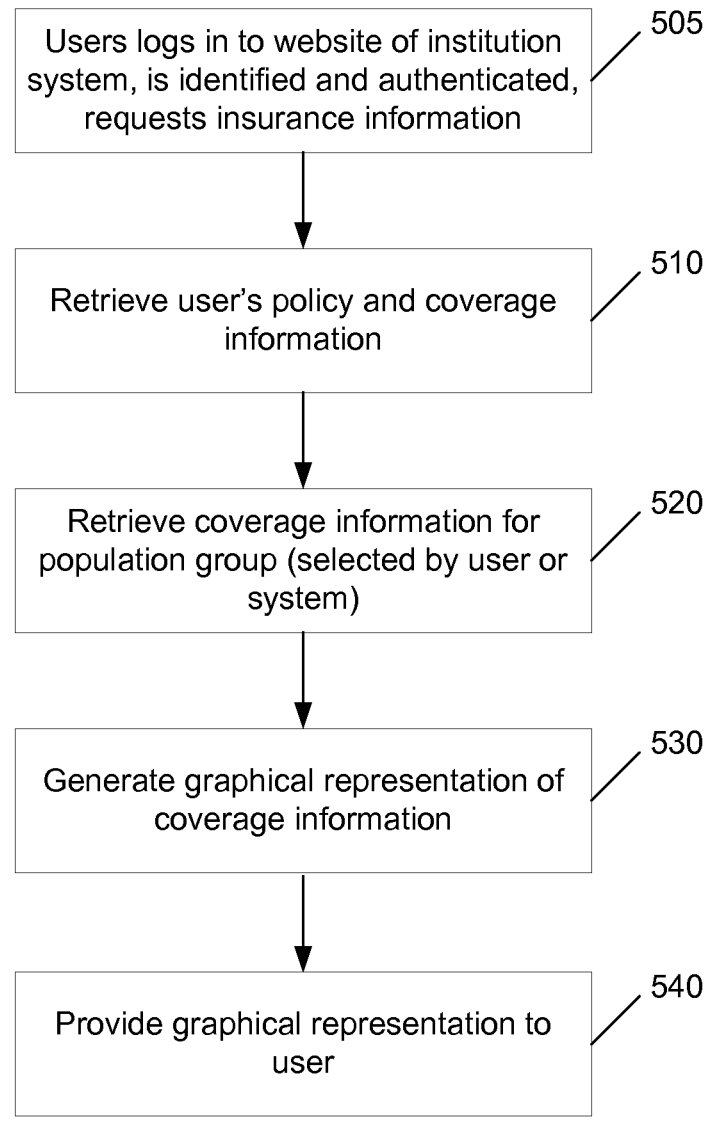
FIG. 5 is an operational flow of another implementation of a method that may be used to provide insurance policy coverage information.

FIG. 5 is an operational flow of another implementation of a method 500 that may be used to provide insurance policy coverage information. At operation 505, a user may log into a website associated with the institution system, may be identified and authenticated using any known techniques, and may request insurance information. At operation 510, information pertaining to the user and the user's policy and coverage information may be retrieved from storage.

At operation 520, coverage information for a particular population group may be retrieved from storage. In an implementation, the coverage information that is retrieved is for users in the population group who have a policy with the institution system that is the same type of policy as the user is requesting information on (e.g., automobile insurance, homeowner's insurance, etc.). The population group may be selected by the user and may be based on one or more factors, such as income, marital status, age, number of children, residence location, type of vehicle, age of vehicle, etc. A user may select these factors via a website associated with the institution system or via a graphical representation provided to the user.

Alternatively, the institution system may select a population group for comparison. In an implementation, the institution system may access information about the user (e.g., from user storage 24 in FIG. 1) and generate a profile of the user based on the information. The institution system may then retrieve coverage information for a group of users that have a similar profile.

At operation 530, a graphical representation of coverage information may be generated based on the retrieved information and provided to the user. The graphical representation may show coverage information for the user as well as for the population group. In this manner, the user may see how their coverage compares to the coverage of a peer group or population of their choice (e.g., those with similar salaries, those who live in the same city, etc.).

In an implementation, a graphical representation may be used to contrast and compare coverage information, including costs, available at other institutions, such as at a competitor insurance company or a competitor financial services institution. This may provide additional information that may be helpful to the user.

Although examples described herein refer to automobile insurance, any type of insurance may be used such as life, homeowners, renters, etc. It is contemplated that multiple types of insurance may be presented to a user and the user may select a particular type of insurance for which a graphical representation may be generated and displayed.

Exemplary Computing Arrangement

Figure 6:
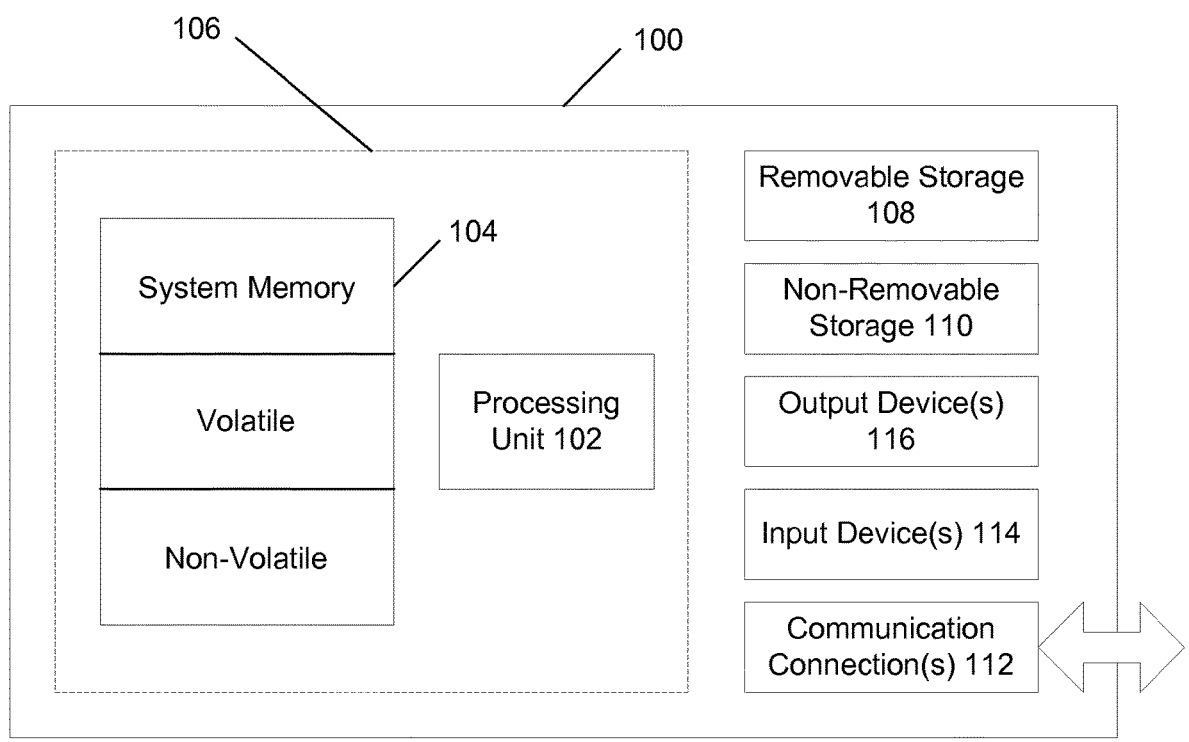
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   generating a profile associated with a user accessible via a website;
   determining a coverage amount for at least one of a plurality of policy line item coverage categories of an insurance policy of the user;
   retrieving, from a user profile database, a plurality of profiles of users similar to the user;
   determining, based on the plurality of profiles, a median coverage of the at least one of the plurality of policy line item coverage categories;
   determining a recommended coverage amount of the at least one of the plurality of policy line item coverage categories;
   generating a graphical user interface comprising:
   a graphical representation of a coverage amount for each of the plurality of policy line item coverage categories;
   a graphical representation of the recommended coverage amount of the at least one of the plurality of policy line item coverage categories;
   a graphical representation of the median coverage of the at least one of the plurality of policy line item coverage categories; and
   a premium display indicative of a premium of the insurance policy, wherein the graphical user interface is configured to dynamically adjust the premium display in response to receiving a user input.

2. The method of claim 1, wherein the user input indicates a modification of a coverage amount of one or more of the plurality of policy line item coverage categories.

3. The method of claim 1, wherein the user input indicates a deductible amount.

4. The method of claim 1, wherein the insurance policy comprises a vehicle insurance policy; and
wherein the plurality of policy line item coverage categories comprise at least one of bodily injury, property damage, towing, rental reimbursement, or labor.

5. The method of claim 1, wherein the graphical representation of the coverage amount for each of the plurality of policy line item coverage categories comprises a drop-down list.

6. The method of claim 1, wherein the graphical user interface comprises a save changes button;
wherein the method further comprises modifying a term of the insurance policy based on the user selecting the save changes button.

7. The method of claim 1, wherein the plurality of policy holders comprise policy holders with at least one of a similar age, income, marital status, number of children to the user.

8. The method of claim 1, wherein the plurality of policy line item coverage categories comprise at least one of medical expenses, loss of income, or essential services.

9. A method comprising:
generating a profile associated with a user accessible via a website;
retrieving, from a user profile database, a plurality of profiles of users similar to the user;
determining a coverage amount for an insurance policy of the user;
determining, based on a plurality of profiles, a median coverage of the insurance policy;
determining a recommended coverage amount of insurance policy;
generating a graphical user interface comprising a dynamic bar chart, wherein the dynamic bar chart comprises:
a graphical representation of a scale;
a coverage amount indicator located at a position on the scale representing the coverage amount;
a recommended coverage amount indicator located at a position on the scale representing the recommended coverage amount;
a median coverage indicator located at a position on the scale representing an amount of the median coverage; and
a premium indicator located at a position on the scale representing an amount of a premium of the insurance policy; and
dynamically modifying, in response to receiving a user input, a location of the premium indicator on the scale.

10. The method of claim 9, wherein the user input indicates a modification of the coverage amount.

11. The method of claim 9, wherein the plurality of policy holders comprise policy holders with at least one of a similar type of residence or type of vehicle to the user.

12. The method of claim 9, wherein the graphical user interface further comprises an indication of terms of a different insurance than the insurance policy of the user.

13. The method of claim 9, further comprising rendering another graphical user interface to be displayed to a representative, the another graphical user interface comprising a representation of the graphical user interface displayed to the user.

14. The method of claim 9, wherein the plurality of policy holders comprise policy holders that have an insurance policy with an institution associated with the insurance policy of the user.

15. A method comprising:
generating a profile associated with a user accessible via a website;
retrieving, from a user profile database, a plurality of profiles of users similar to the user;
generating, based at least on the plurality of profiles, a graphical user interface comprising:
a graphical representation of a scale;
a coverage amount indicator located at a position on the scale representing a coverage amount of an insurance policy of the user;
a recommended coverage amount indicator located at a position on the scale representing a recommended coverage amount of the insurance policy;
a median coverage indicator located at a position on the scale representing a median coverage amount of the insurance policy; and
a premium indicator located at a position on the scale representing an amount of a premium of the insurance policy, wherein the position of the premium indicator on the scale is dynamically modified in response to receiving a user input.

16. The method of claim 15, wherein the user input indicates a modification of the coverage amount.

17. The method of claim 15, wherein the median coverage amount of the insurance policy is based at least on insurance policies of other users.

18. The method of claim 15, further comprising an icon configured to enable the user to lock-in changes to the insurance policy.

19. The method of claim 18, wherein a term of the insurance policy are modified based on the user selecting the icon.

20. The method of claim 15, further comprising at least one of a minimum coverage amount indictor or a maximum coverage amount indicator.

* * * * *